United States Patent
Torsner et al.

(10) Patent No.: US 10,623,134 B2
(45) Date of Patent: Apr. 14, 2020

(54) COMMUNICATION DEVICE AND METHOD THEREIN FOR TRANSMITTING DATA PACKETS IN A WIRELESS COMMUNICATION NETWORK

(71) Applicant: Telefonaktiebolaget LM Ericsson (publ), Stockholm (SE)

(72) Inventors: Johan Torsner, Kyrkslätt (FI); Robert Baldemair, Solna (SE); Erik Eriksson, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 122 days.

(21) Appl. No.: 16/066,394

(22) PCT Filed: Dec. 31, 2015

(86) PCT No.: PCT/SE2015/051398
§ 371 (c)(1),
(2) Date: Jun. 27, 2018

(87) PCT Pub. No.: WO2017/116293
PCT Pub. Date: Jul. 6, 2017

(65) Prior Publication Data
US 2019/0044643 A1 Feb. 7, 2019

(51) Int. Cl.
*H04L 1/00* (2006.01)
*H04L 5/00* (2006.01)
(Continued)

(52) U.S. Cl.
CPC .......... *H04L 1/0003* (2013.01); *H04L 1/00* (2013.01); *H04L 1/0009* (2013.01);
(Continued)

(58) Field of Classification Search
CPC combination set(s) only.
See application file for complete search history.

(56) References Cited

U.S. PATENT DOCUMENTS 6,954,885 B2    10/2005   Hurt et al.
10,098,095 B2 *   10/2018   Krishna Kumar .... H04L 1/0009
(Continued)

FOREIGN PATENT DOCUMENTS

WO     2014035301 A1    3/2014

OTHER PUBLICATIONS

Ericsson: "Study on Latency reduction techniques For LTE", "RP-150310—Motivation for new proposed SI", 3GPP Draft; RP-150310 Motivations for Study on Latency Reduction Techniques, 3RD Generation Partnership Project (3GPP), vol. TSG RAN, Mar. 3, 2015 (Mar. 3, 2015), XP051650108, 16 Pages.
(Continued)

*Primary Examiner* — Otis L Thompson, Jr.
(74) *Attorney, Agent, or Firm* — Sage Patent Group (57) ABSTRACT

A first communication device (110) and method therein for transmitting a message generated in the first communication device (110) to a second communication device (120) in a wireless communication network (100) is disclosed. The first communication device, prior to transmission of the message being triggered, encodes, or encodes and modulates, the message into more than one data packet variants using different combinations of coding and/or modulation parameters for the more than one data packet variants. When transmission of the message is triggered, the first communication device (110) receives, from the second communication device (120), information about physical transmission resources and/or physical layer parameters assigned to the first communication device (110). The first communication device (110) then transmits the message using one of the
(Continued)

data packet variants where the used data packet variant is selected based on the received information about physical transmission resources and/or physical layer parameters.

26 Claims, 6 Drawing Sheets

(51) Int. Cl.
    *H04L 25/02* (2006.01)
    *H04W 88/04* (2009.01)
    *H04W 4/70* (2018.01)

(52) U.S. Cl.
    CPC .......... *H04L 1/0043* (2013.01); *H04L 1/0061* (2013.01); *H04L 5/0048* (2013.01); *H04L 25/0224* (2013.01); *H04W 88/04* (2013.01); *H04W 4/70* (2018.02)

(56) References Cited

U.S. PATENT DOCUMENTS

| | | | |
|---|---|---|---|
| 10,291,378 B1* | 5/2019 | Bai | H04W 68/02 |
| 2002/0036992 A1 | 3/2002 | Balachandran et al. | |
| 2004/0174856 A1* | 9/2004 | Brouet | H03M 13/35 370/349 |
| 2005/0141454 A1* | 6/2005 | Jain | H04L 1/0002 370/331 |
| 2007/0258532 A1 | 11/2007 | Bai et al. | |
| 2010/0272011 A1 | 10/2010 | Palanki et al. | |
| 2013/0163573 A1* | 6/2013 | Oizumi | H04L 5/0007 370/336 |
| 2014/0307569 A1* | 10/2014 | Barbieri | H04L 5/0032 370/252 |
| 2015/0139002 A1* | 5/2015 | Lee | H04W 24/08 370/252 |
| 2015/0215068 A1* | 7/2015 | Wu | H04L 1/0003 370/329 |
| 2016/0234820 A1* | 8/2016 | Mallik | H04W 72/0406 |
| 2017/0026297 A1* | 1/2017 | Sun | H04L 47/25 |
| 2018/0176963 A1* | 6/2018 | Zeng | H04L 5/0007 |
| 2018/0241499 A1* | 8/2018 | Einhaus | H04L 1/0038 |
| 2019/0253342 A1* | 8/2019 | N Das | H04L 1/08 |
| 2019/0260501 A1* | 8/2019 | Kim | H04L 1/00 |
| 2019/0327639 A1* | 10/2019 | Huang | H04W 28/16 |
| 2019/0363835 A1* | 11/2019 | Park | H04L 1/1812 |

OTHER PUBLICATIONS

ZTE: "L1 considerations on latency reduction", 3GPP TSG RAN WG1 Meeting #83, Anaheim, USA, Nov. 15-22, 2015, R1-157151, 6 Pages.

Extended European Search Report—15912152.4—dated Jul. 18, 2019—8 Pages.

* cited by examiner

COMMUNICATION DEVICE AND METHOD THEREIN FOR TRANSMITTING DATA PACKETS IN A WIRELESS COMMUNICATION NETWORK

TECHNICAL FIELD

Embodiments herein relate to a wireless communication device and a method therein. In particular, they relate to a first communication device and method therein for transmitting a message to a second communication device in a wireless communication network. They further relate to a second communication device and method therein for receiving a message.

BACKGROUND

Wireless communication devices may be referred to as, for example, mobile telephones, user equipments (UEs), wireless terminals, mobile terminals, mobile stations, cellular telephones, smart phones, laptops, tablet computers or phablets with wireless capability etc. Wireless communication devices are enabled to communicate or operate wirelessly in a Heterogeneous wireless communication system comprising multiple networks or Heterogeneous Networks (HetNet) with access nodes, such as a cellular communications network comprising Second/Third Generation (2G/3G) network, Long Term Evolution (LTE) network, Worldwide interoperability for Microwave Access (WiMAX) network, etc.

The wireless communication device in the present context may be, for example, portable, pocket-storable, hand-held, computer-comprised, vehicle-mounted mobile devices, or any machine-type device, enabled to communicate voice and/or data via an access node with another entity, such as another communication device or a server in the wireless communication system.

The 5G, i.e. the 5th generation mobile networks or 5th generation wireless systems denotes the next major phase of mobile telecommunications standards beyond the current International Mobile Telecommunications-Advanced, 4G/IMT-Advanced standards. In the 5G wireless communication system, machine-to-machine communication or Machine-Type Communications (MTC) is one of the major research topics. Developing higher reliability and low latency of communications for Mission Critical-MTC is one important aspect, where ultra-low delay is a critical parameter. The Mission Critical-MTC concept should address design trade-offs regarding e.g., end-to-end latency, transmission reliability, system capacity and deployment, and provide solutions for design of wireless networks for different industrial application use cases.

One of the key design challenges is to achieve very low latency in the order of 1 ms for data transmission in order to enable new use cases such as real time control of industrial equipment or remote controlled vehicles. Existing wireless systems have in contrast been designed mainly with other use cases in mind, such as voice and internet access, where a latency of 20-50 ms is acceptable.

Existing wireless systems typically apply an approach where modulation and physical layer encoding is performed after available resources for transmission are known. In e.g. LTE, a user equipment (UE) receives a scheduling grant from the network which specifies radio resources or physical transmission resources that shall be used for a transmission. Parameters like transmission time and frequency, modulation and coding scheme are indicated by the scheduling grant and the UE performs the physical layer coding and modulation to fit the indicated radio resources.

The coding and modulation however take time, which makes it difficult to reach the low latency required for the transmission in the new use cases. The problem becomes more serious especially when a time critical message, e.g. an alarm message that needs to be transmitted immediately, is generated in a machine or device.

SUMMARY

It is therefore an object of embodiments herein to provide improved transmissions with reduced latency in transmission of time critical messages in a wireless communication network.

According to a first aspect of embodiments herein, the object is achieved by a method performed in a first communication device for transmitting a message generated in the first communication device to a second communication device in a wireless communication network. Prior to transmission of the message being triggered, the first communication device encodes, or encodes and modulates, the message into more than one data packet variants using different combinations of coding and/or modulation parameters for the more than one data packet variants. When transmission of the message is triggered, the first communication device receives, from the second communication device, information indicative of physical transmission resources and/or physical layer parameters assigned to the first communication device and transmits the message using one of the more than one data packet variants, wherein the used data packet variant is selected based on the received information indicative of physical transmission resources and/or physical layer parameters.

According to a second aspect of embodiments herein, the object is achieved by a first communication device for transmitting a message generated in the first communication device to a second communication device in a wireless communication network. The first communication device is configured to, prior to transmission of the message being triggered, encode, or encode and modulate, the message into more than one data packet variants using different combinations of coding and/or modulation parameters for the more than one data packet variants. The first communication device is further configured to, when transmission of the message is triggered, receive, from the second communication device, information indicative of physical transmission resources and/or physical layer parameters assigned to the first communication device and transmit the message using one of the more than one data packet variants, wherein the used data packet variant is selected based on the received information indicative of physical transmission resources and/or physical layer parameters.

According to a third aspect of embodiments herein, the object is achieved by a method performed in a second communication device for receiving a message transmitted by a first communication device in a wireless communication network. Prior to receiving of a scheduling request from the first communication device, the second communication device configures reception of the message from the first communication device by obtaining information indicative of all sets of possible physical transmission resources and/or physical layer parameters, or indicative of a subset of the sets of possible physical transmission resources and/or physical layer parameters, available for receiving the message from the first communication device, wherein the sets of possible physical transmission resources and/or physical layer parameters, or subset of the sets of possible physical transmission resources and/or physical layer parameters, correspond to more than one data packet variants obtainable for the first communication device by encoding, or encoding and modulating, the message using different combinations of coding and/or modulation parameters. When a scheduling request is received from the first communication device, the second communication device transmits, to the first communication device, information indicative of physical transmission resources and/or physical layer parameters assigned to the first communication device and receives, from the first communication device, the message that has been encoded, or encoded and modulated, by the first communication device into the data packet variant corresponding to the physical transmission resources and/or physical layer parameters assigned to the first communication device.

According to a fourth aspect of embodiments herein, the object is achieved by a second communication device for receiving a message transmitted by a first communication device in a wireless communication network. The second communication device is configured to, prior to receiving of a scheduling request from the first communication device, configure reception of the message from the first communication device by being configured to obtain information indicative of all sets of possible physical transmission resources and/or physical layer parameters, or indicative of a subset of the sets of possible physical transmission resources and/or physical layer parameters, available for receiving the message from the first communication device. The sets of possible physical transmission resources and/or physical layer parameters, or subset of the sets of possible physical transmission resources and/or physical layer parameters, correspond to more than one data packet variants obtainable for the first communication device by encoding, or encoding and modulating, the message using different combinations of coding and/or modulation parameters, The second communication device is further configured to, when a scheduling request is received from the first communication device, transmit, to the first communication device, information indicative of physical transmission resources and/or physical layer parameters assigned to the first communication device and receive, from the first communication device, the message that has been encoded, or encoded and modulated, by the first communication device into the data packet variant corresponding to the physical transmission resources and/or physical layer parameters assigned to the first communication device.

By performing the encoding and modulating, or in some embodiments only encoding, of the generated message in the communication device into different variants of data packets prior to the transmission being triggered, the latency for time critical message communication is reduced. Since available radio resources, or physical transmission resources, and coding and modulation schemes to apply are not yet known, the encoding, or encoding and modulating, of a time critical message is done in several variants using different coding and modulation parameters, or in some embodiments using different coding parameters only, that are deemed possible or feasible. Thus several data packets are created that may potentially be transmitted. When the transmission opportunity comes or is triggered, the actual physical transmission resources, or radio resources, and/or physical layer parameters to be used for the transmission are assigned and known. The communication device then picks the data packet that best matches the indicated physical layer parameters and/or physical transmission resources and may quickly transmit the data packet.

Thus, embodiments herein provide methods and communication devices for improving transmission of messages in the wireless communication network by transmitting the messages with reduced latency.

BRIEF DESCRIPTION OF THE DRAWINGS

Examples of embodiments herein are described in more detail with reference to attached drawings in which.

DETAILED DESCRIPTION

Figure 1:
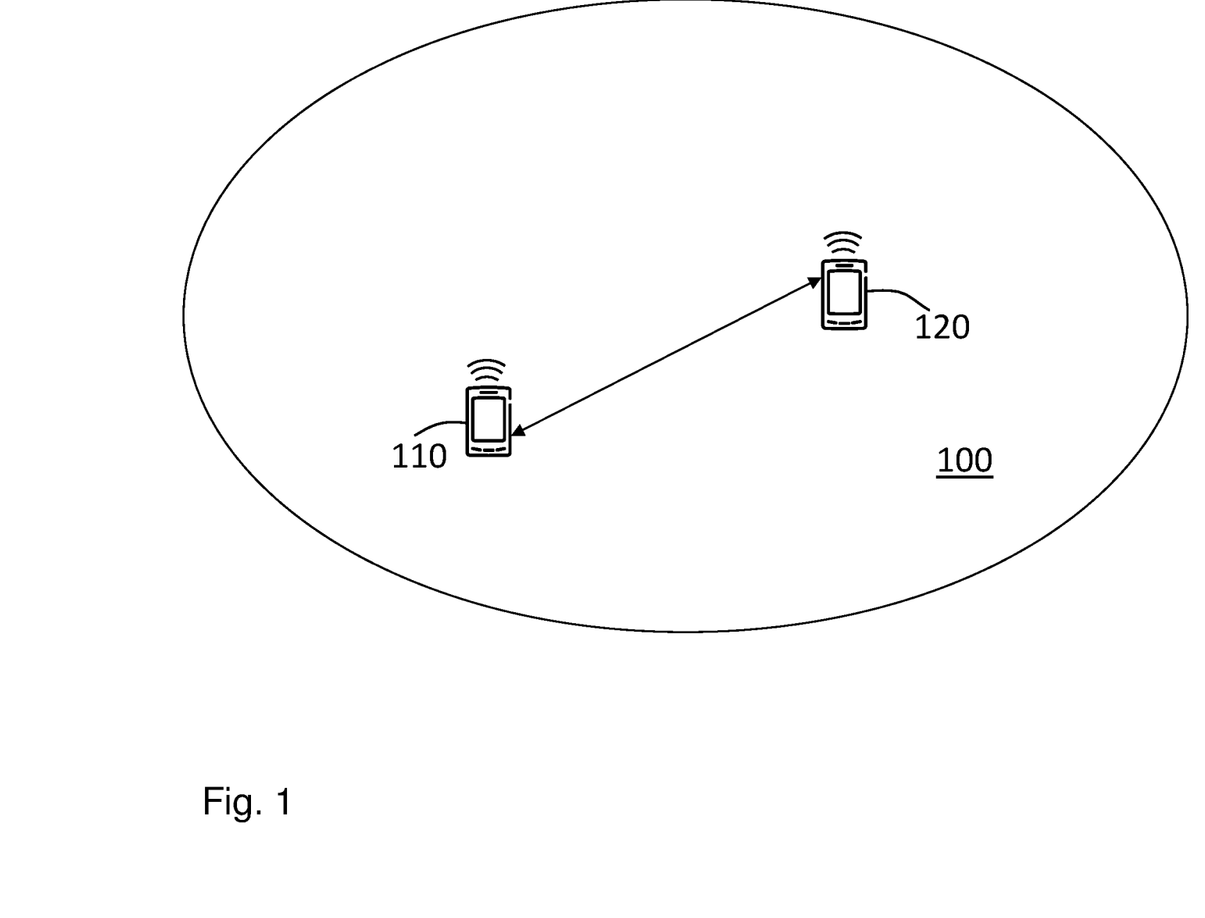
FIG. 1 is a schematic diagram illustrating an example of a wireless communication network.

FIG. 1 depicts an example of a wireless communication network 100 in which embodiments herein may be implemented. The wireless communication network 100 comprises one or more wireless communication networks such as e.g. LTE network, Wideband Code Division Multiple Access (WCDMA) network, Global System for Mobile Communications (GSM) network, Wimax, Universal Mobile Telecommunications System (UMTS) or any 2G/3G/4G/5G networks etc.

A number of wireless communication devices operate in the wireless communication network 100, wherein a first communication device 110 and a second communication device 120 are shown in FIG. 1. The first and second communication devices 110, 120 may, e.g. be any types of machines or devices with wireless communication capability such as MTC or Machine-to Machine (M2M) devices, or any other radio network units capable to communicate over a radio link in a wireless communications network, e.g. a mobile terminal or station, a wireless terminal, a user equipment, a mobile phone, a computer such as e.g. a laptop, a Personal Digital Assistant (PDA) or a tablet computer etc.

Figure 2A:
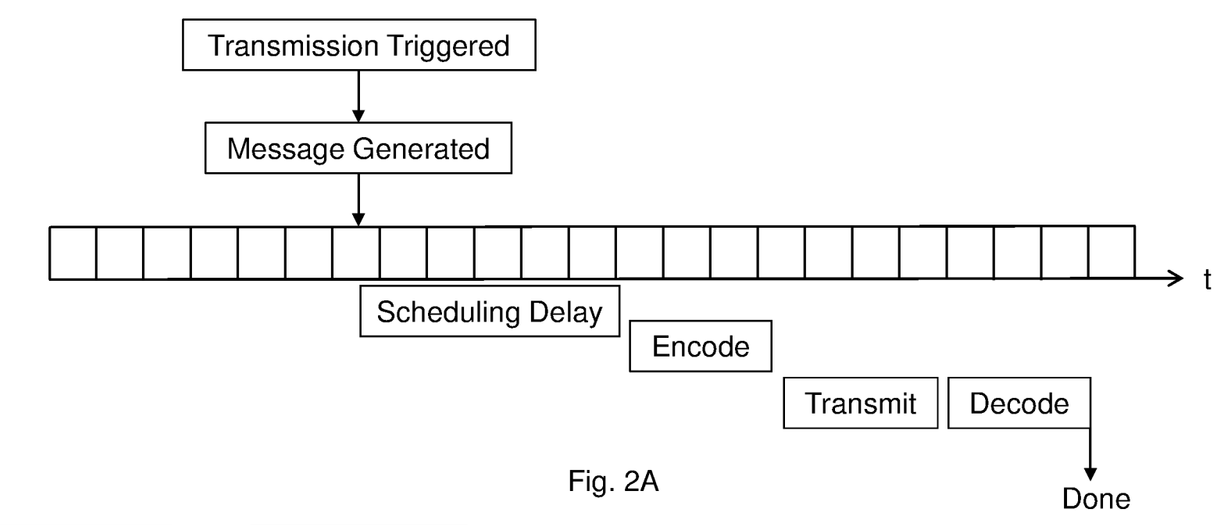
FIG. 2A is a diagram illustrating a method in a communication device according to state of the art.

Embodiments are described below for a case of a time critical alarm message compared to a solution in state of the art. The solution in state of the art is illustrated in FIG. 2A, where time frames and different actions along the time frames are shown. Thus, according to the state of the art once a transmission is triggered, e.g. by a fault in a machine or device, referred to here as transmitting device, a message is generated. The device then waits until next transmission opportunity comes. Depending on scheduling methods used this may involve several actions to request transmission resources, e.g. by transmitting a scheduling request and receiving a scheduling grant indicating radio resources and physical layer parameters to use for the transmission. These actions are included in Scheduling Delay as shown in FIG. 2A. Once the physical layer parameters are known, the transmitting device performs coding and modulation of the message into a data packet, shown as Encode in FIG. 2A, and then transmits the data packet. At a receiving device decoding of the data packet is performed. This process may take too long time if the message is a time critical alarm message which needs to be transmitted without too much delay, i.e. fast enough to enable required measures to be taken before it is too late.

Figure 2B:
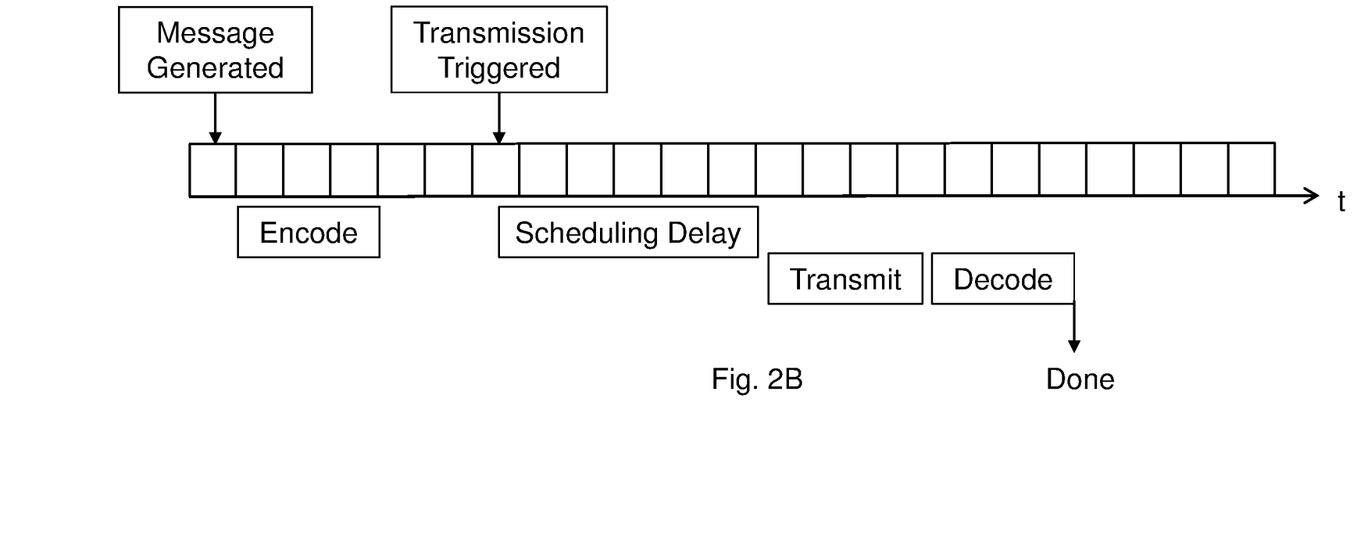
FIG. 2B is a diagram illustrating a method in a communication device according to an embodiment herein.

According to embodiments herein, as shown in FIG. 2B, when a message is generated in a machine, e.g. in the first communication device 110, the message is encoded and modulated, or in some embodiments encoded only, into data packets prior to a transmission of the message being triggered, shown as Encode in FIG. 2B. When the transmission is triggered, e.g. by an event requiring an alarm to be raised, the first communication device 110 receives information about radio or physical transmission resources and/or physical layer parameters assigned to it. As described above, depending on scheduling methods used this may involve several actions, e.g. transmission of a scheduling request and reception of a scheduling grant, which are included in Scheduling Delay as shown in FIG. 2B. The first communication device 110 then transmits the data packets according to the radio resources and/or physical layer parameters assigned to it. By performing encoding and modulating, or in some embodiments encoding only, of the message into data packets in advance of the transmission of the message being triggered, the message will be ready to be transmitted when it is triggered, and transmission latency will be reduced. It can be seen in FIG. 2B, that the decoding of the transmitted message, shown as Done, is completed earlier in FIG. 2B than in FIG. 2A.

Figure 3:
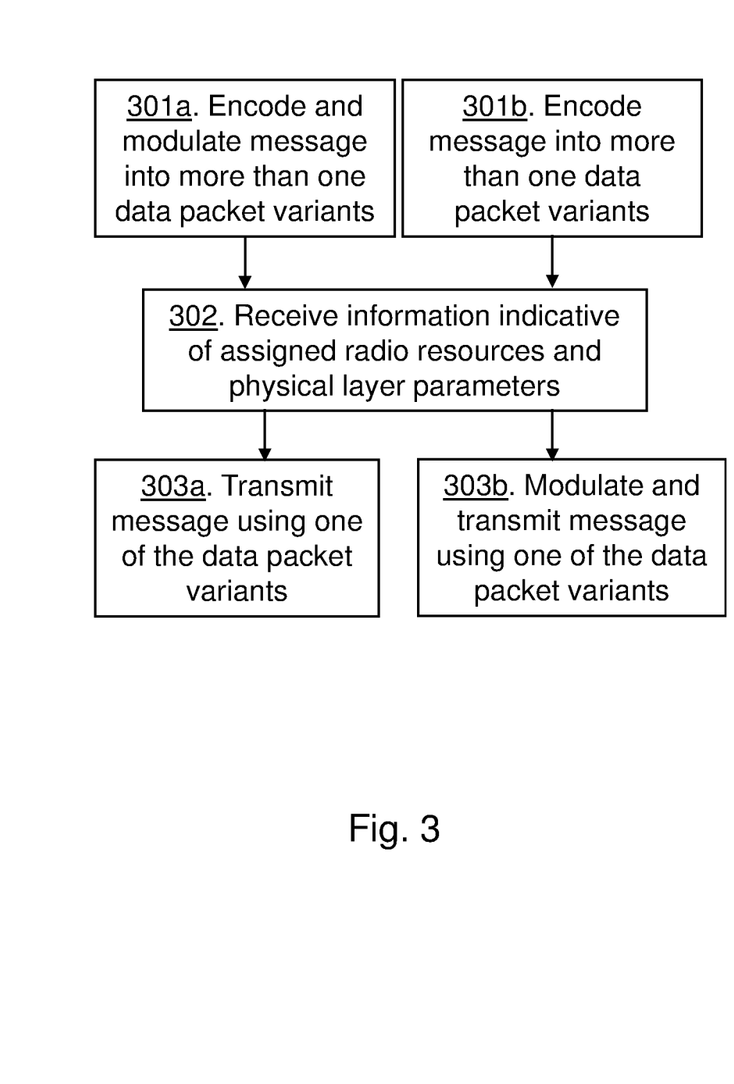
FIG. 3 is a flowchart depicting one embodiment of a method in a first communication device.

Example of embodiments of a method in the first communication device 110 for transmitting a message to a second communication device 120 in a wireless communication network 100 will now be described in more detail with reference to FIG. 3. As mentioned above, the first and second communication devices 110, 120 operate in the wireless communication network 100 and the wireless communication network 100 comprises one or more LTE networks or any one or more 2G/3G/4G/5G networks or any other wireless network. The second communication device 120, to which the first communication device 110 transmits the message, may, for example, be a network node, a base station or a peer communication device. The method comprises the following actions, which actions may be taken in any suitable order.

Action 301a and 301b

Prior to transmission of a message generated in the first communication device 110 being triggered, the first communication device 110 encodes and modulates, shown as 301a, or just encodes, shown as 301b, the message into more than one data packet variants using different combinations of coding and/or modulation parameters for each of the data packet variants.

Different messages may be generated in the first communication device 110, these messages may e.g. be alarm messages which may exist in a limited number of variants. These messages may be generated at any time, for example when the device is powered on or when a fault happened. The message generated in the first communication device 110 may be a time critical message that needs to be transmitted without too much delay. Therefore, to save encoding time, once the messages are generated they are pre-encoded into several data packet variants using different combinations of coding and/or modulation parameters, e.g. using only different modulation parameters, using only different coding parameters or schemes, or using both different modulation parameters and coding parameters or schemes. This may imply that coding and modulation, or coding only, is performed for all N possible physical layer parameters that may occur or only a subset k of the possible physical layer parameters, where N or k may typically be limited to around 10 depending on different networks involved. Thus the more than one data packet variants may correspond to all sets of possible physical transmission resources and/or physical layer parameters or to a subset of the set of possible physical transmission resources and/or physical layer parameters. In this way, a number of data packet variants are generated which are ready to be transmitted. The generated more than one data packets are stored in the first communication device 110 for future transmission.

According to some embodiments, the more than one data packet variants correspond to different physical transmission resources. The different physical transmission resources may comprise different amounts of physical transmission resources, i.e. the amount of resources is different. The different physical transmission resources may further correspond to different resources although the amount of resources is the same but the resources are different in location, e.g. different in time and/or frequency. Further, the different physical transmission resources may comprise any one or a combination of time-domain, code-domain, space-domain, frequency-domain or time-frequency-domain resources.

For example, if the physical layer parameters include frequency locations of physical transmission resources, or frequency assignment is known, even the Orthogonal Frequency-Division Multiplexing OFDM, or DFTS-OFDM modulation may be performed in advance to generate transmission-ready time-domain signals, i.e. the physical transmission resources are time-domain signals. For a single-carrier system, the pre-calculated data packet variants may correspond to time-domain signals.

According to some embodiments, encoding 301b, or encoding and modulating 301a, the message into more than one data packet variants in the first communication device 110, may comprise at least one of selecting modulation order and defining different mapping of physical transmission resources in any one or a combination of time-domain, code-domain, space-domain, frequency-domain or time-frequency-domain for the more than one data packet variants.

According to some embodiments, encoding 301b, or encoding and modulating 301a, the message into more than one data packet variants in the first communication device 110 may further comprise any one or a combination of scrambling, rate matching, error coding, segmentation and Cyclic Redundancy Check, CRC insertion.

The following are short explanations on different coding techniques:

Scrambling: The encoded code word is XOR-ed with either a device or cell specific sequence. On the receiver side the received code word is prior to or during the decoding process XOR-ed with the same sequence to recover the original encoded code word, this operation is denoted descrambling. Without scrambling an interfering transmission using the same coding parameters leaves the receiver without possibility to distinguish between the desired and the interfering transmission. Scrambling together with descrambling (using the same scrambling sequence) restores the original transmission while an interfering transmission scrambled and descrambled with different sequences transforms into a noise-like sequence.

Rate matching: The amount of coded bits often does not exactly match the assigned transmission resources. During rate matching some encoded bits are discarded or punctured to match the available transmission resources.

Error coding: Instead of transmitting the information bits as they are, additional redundancy is introduced in the form of extra bits to be transmitted together with the information bits. This additional redundancy helps the receiver to correct and/or detect errors in the transmission. Examples of well-known error correcting codes are convolutional codes and block codes such as Bose, Chaudhuri and Hocquenghem (BCH) codes, Reed Muller codes, Turbo codes, Low Density Parity Check (LDPC) codes.

Cyclic Redundancy Check (CRC): Prior to encoding the information bits are concatenated with a bit pattern that is derived from the information bit sequence. Very often this bit pattern is denoted CRC and is the remainder of the long binary division between information bit sequence and CRC polynomial. The information bits together with CRC is then encoded with an error correction code and transmitted. The receiver decodes the data and obtains its best guess of information bits and CRC. Based on decoded information bits the receiver calculates the CRC and compares it with the received CRC; if they are the same the receiver concludes, with very high likelihood, that it successfully decoded the data and the decoded information bits are correct. If the calculated CRC does not match the received CRC an error which is not possible to correct occurred. CRC insertion thus enables error detection.

According to some embodiments, encoding 301b, or encoding and modulating 301a, the message into more than one data packet variants in the first communication device 110 may further comprise any one or a combination of Run-Length Coding, RLC, segmentation, concatenation and generation of RLC and Media Access Control, MAC, headers and insertion of MAC control elements and padding.

According to some embodiments, the different physical transmission resources may correspond to different collections of frequency resources for an Orthogonal Frequency-Division Multiplexing, OFDM, modulation system, different collections of frequency resources for a precoded multi-carrier modulation system, different collections of frequency resources for a multi-carrier modulation system, different sets of spreading codes for a Code Division Multiple Access, CDMA, modulation system, different sets of frequency resources for a Filterbank Multi Carrier, FBMC, modulation system, different sets of frequency resources for an Offset-Quadrature Amplitude Modulation, QAM, system, different sets of frequency resources for a Generalized Multicarrier, GMC, modulation system, or different collections of time resources for a time-division multiple access system.

According some embodiments, the message generated in the first communication device 110 may comprise information, e.g. in a control element, indicating a time when the message is generated. This information may be used by the receiver, i.e. the second communication device 120, in applications where the message transmission comprises other information, e.g. included in other control elements, such as for example buffer status reports, which would be useful to the second communication device 120 if the time that it relates to can be determined. The information indicating the time when the message is generated may also be used for future prediction of data packet arrival, e.g. to improve time scheduling of periodic services.

According to some embodiments, the more than one data packet variants correspond to different transport block sizes.

Action 302

When transmission of the message is triggered, the first communication device 110 receives from the second communication device 120, information indicative of physical transmission resources and/or physical layer parameters assigned to the first communication device 110. Once the transmission is triggered, as discussed above, depending on the scheduling method used, the first communication device 110 may request transmission resources, e.g. by transmitting a scheduling request and receiving a scheduling grant. The information about physical transmission resources and/or physical layer parameters assigned to the first communication device 110 to use for the transmission may be included in the scheduling grant.

According to some embodiments, the first communication device 110 may receive from the second communication device 120, an index indicating the physical transmission resources and/or physical layer parameters assigned to the first communication device. The index points out which physical transmission resources and/or physical layer parameters is assigned to the first communication device 110 among the sets of possible physical transmission resources and/or physical layer parameters.

Action 303a and 303b

When the transmission opportunity occurs, the first communication device 110 transmits, shown as 303a, the message using one of the more than one data packet variants. The used data packet variant is selected based on the received information on physical transmission resources and/or physical layer parameters. This means that the first communication device 110 picks one of the previously generated data packets corresponding to the message that best fits the available physical transmission resource and physical layer parameters that have been assigned to it and transmits that data packet. When the first communication device 110 just encodes, as in action 301b, the message into more than one data packet variants, the first communication device 110 then modulates and transmits, shown as 303b, the message using one of the more than one data packet variants. The used data packet variant is selected based on the received information on physical transmission resources and/or physical layer parameters.

Figure 4:
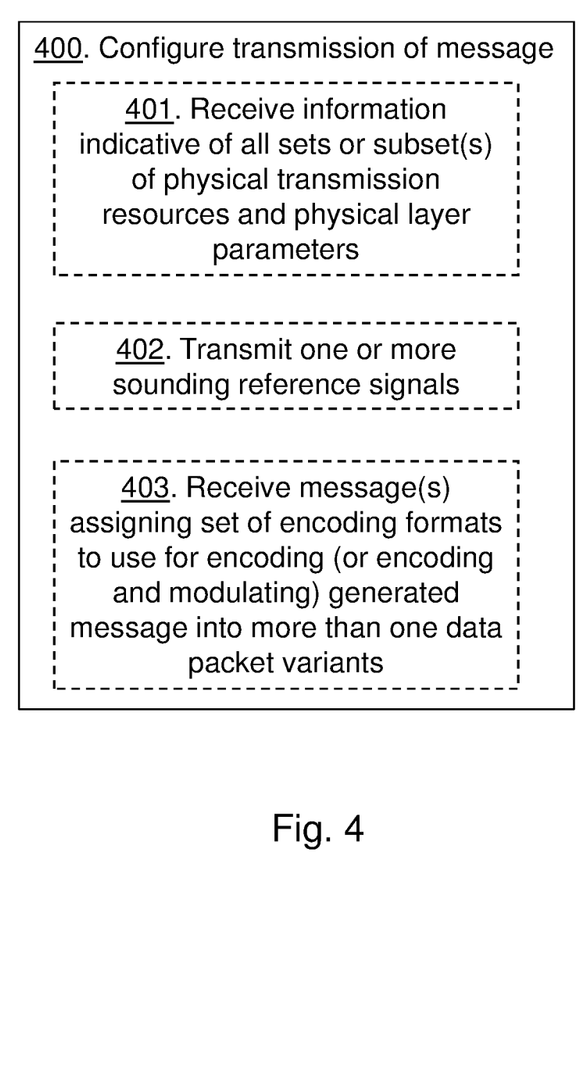
FIG. 4 is a flowchart depicting one embodiment of a method in a first communication device.

According to some embodiments, the method in the first communication device 110 for transmitting a message to the second communication device 120 may further comprise the following actions, described with reference to FIG. 4. This figure illustrates an Action 400, where the first communication device 110 configures, or prepares for, transmission of the message that is generated in the first communication device 110. The Action 400 may comprise actions 401-403, which are optional and may be taken in any suitable order or combination. In some embodiments action 401 may be performed, but not actions 402 and 403. In other embodiments actions 402 and 403 are performed, but there is no need to perform action 401, e.g because the information is preconfigured or otherwise known to the first communication device 110. Other possibilities are that all three actions 401-403 are performed, or that only actions 401 and 402 are performed, in which latter case the information received in action 401 may be based on the transmission of sounding reference signals in action 402. These actions may be performed before Actions 301-303 as described above.

Action 401

In order to enable or assist the first communication device 110 to perform pre-encoding, or pre-encoding and modulating, of a message, the second communication device 120 may signal information indicative of all sets of possible physical transmission resources and/or physical layer parameters, or a subset of the sets of possible physical transmission resources and/or physical layer parameters, available for transmitting the message to the second communication device 120. This means that the first communication device 110 may take action to receive from the second communication device 120, information indicative of all the sets of possible physical transmission resources and/or physical layer parameters or the subset of the sets of possible physical transmission resources and/or physical layer parameters. In cases where only a subset of physical transmission resources and the physical layer parameters are available for transmitting the message to the second communication device 120, this subset may either be signaled from a peer device, e.g. the second communication device 120, or derived by the first communication device 110 e.g. from other information, such as available encoding formats, which may be indicated by the second communication device 120, and from information pre-configured in the first communication device 110, such as a relation between all sets of possible physical transmission resources and encoding formats and/or modulation orders.

Action 402

The first communication device 110 may transmit one or more sounding reference signals to the second communication device 120. The reception of one or more sounding reference signals may be used by the second communication device 120 to estimate possible physical transmission resources and physical layer parameters for the transmission by the first communication device 110 of the message generated in the first communication device 110.

Action 403

The first communication device 110 may receive, from the second communication device 120, one or more messages assigning a set of encoding formats to be applied when encoding, or encoding and modulating, the message generated in the first communication device 110 into the one or more data packet variants. The set of encoding formats to be used by the first communication device 110 may be assigned by the second communication device 120 based on the transmitted one or more sounding reference signals. The assigned set of encoding formats may comprise encoding formats which are different depending on one or more of: physical transmission resources, reception points, transmission points and received interferences.

According to some embodiments, the different physical transmission resources may correspond to different encoding formats. As described above, these different encoding formats may be configured in a separate procedure based upon one or multiple sounding reference signals, from which channel state information is acquired at the device receiving the one or multiple sounding reference signals. After transmitting the sounding reference signals, the transmitting device, e.g. the first communication device 110, may receive an encoding format assignment message from the receiving device, e.g. the second communication device 120. Thus all such different encoding formats are possible to be pre-encoded in the transmitting device, e.g. the first communication device 110. The encoding formats may be differentiated into multiple encoding formats according to different characteristics. For example, the different encoding formats may correspond to a set of encoding formats which are different depending on radio resources or physical transmission resources, e.g. different encoding and beam-forming depending on frequency resources; or depending on reception points, e.g. for different reception points, using different beam-forming and encoding formats; or depending on transmission points, e.g. for different transmission points, using different beam-forming and encoding formats; and/or depending on reception interference, e.g. depending on assumed received interference, different encoding formats are used.

According to some embodiments, the first communication device 110 may receive from the second communication device 120, e.g. in a scheduling grant, an index corresponding to the different encoding formats in the encoding format assignment message.

Figure 5:
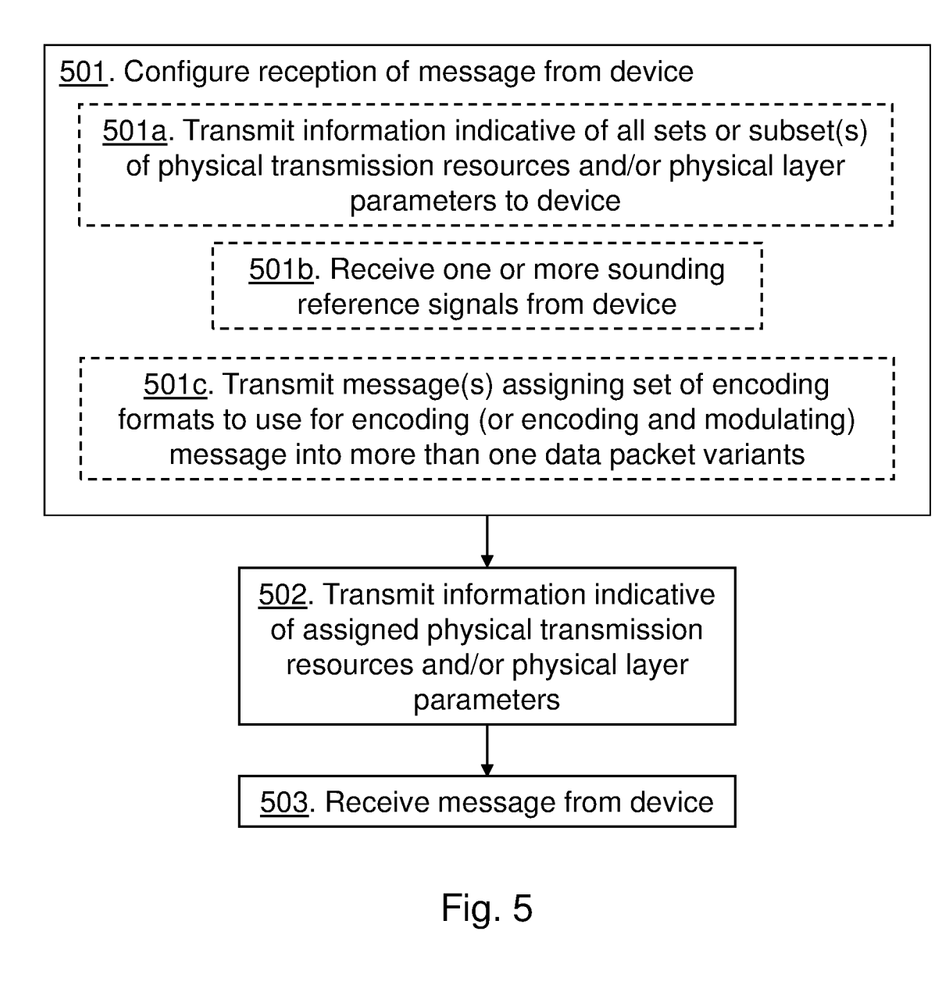
FIG. 5 is a flowchart depicting one embodiment of a method in a second communication device.

Example of embodiments of a method performed in the second communication device 120 for receiving a message from the first communication device 110 will now be described with reference to FIG. 5. The message is transmitted by the first communication device 110 in the wireless communication network 100. The method comprises the following actions:

Action 501

Prior to receiving of a scheduling request from the first communication device 110, the second communication device 120 configures, or prepares for, reception of the message from the first communication device 110 by obtaining information indicative of all sets of possible physical transmission resources and/or physical layer parameters, or indicative of a subset of the sets of possible physical transmission resources and/or physical layer parameters, which are available for receiving the message from the first communication device 110. The sets of possible physical transmission resources and/or physical layer parameters, or subset of the sets of possible physical transmission resources and/or physical layer parameters correspond to more than one data packet variants obtainable for the first communication device 110 by encoding, or encoding and modulating, the message using different combinations of coding and/or modulation parameters.

The Action 501 may comprise actions 501a-501c, which are optional and may be taken in any suitable order or combination. In some embodiments action 501a may be performed, but not actions 501b and 501c. In other embodiments actions 501b and 501c are performed, but there is no need to perform action 501a, e.g. because the information is preconfigured or otherwise known to the first communication device 110. Other possibilities are that all three actions 501a-501c are performed, or that only actions 501a and 501b are performed, in which latter case the information transmitted in action 501a may be based on the reception of sounding reference signals in action 501b.

Action 501a

Prior to receiving of a scheduling request from the first communication device 110, the second communication device 120 may transmit the obtained information indicative of all sets of possible physical transmission resources and/or physical layer parameters, or indicative of the subset of the sets of possible physical transmission resources and/or physical layer parameters, which are available for transmitting the message, to the first communication device 110. This information enables the first communication device 110 to encode, or encode and modulate, the message into more than one data packet variants using different combinations of coding and/or modulation parameters.

Action 501b

The second communication device 120 may receive one or more sounding reference signals from the first communication device 110. The reception of one or more sounding reference signals may be used by the second communication device 120 to estimate possible physical transmission resources and physical layer parameters for the transmission by the first communication device 110 of the message generated in the first communication device 110.

Action 501c

The second communication device 120 may transmit, to the first communication device 110, one or more messages assigning a set of encoding formats to be applied by the first communication device 110 when encoding, or encoding and modulating, the message in the first communication device 110 into the one or more data packet variants. The set of encoding formats to be used by the first communication device 110 may be assigned by the second communication device 120 based on the received one or more sounding reference signals. The assigned set of encoding formats may comprise encoding formats which are different depending on one or more of: physical transmission resources, reception points, transmission points and received interferences.

Action 502

When a scheduling request is received from the first communication device 110, the second communication device 120 transmits to the first communication device 110, information indicative of physical transmission resources and/or physical layer parameters assigned to the first communication device 110. This information helps the first communication device 110 to use one of the more than one data packet variants that best fits the available physical transmission resource and physical layer parameters that have been assigned to it for transmission of the message. The information may be transmitted to the first communication device 110 in a scheduling grant.

Action 503

The second communication device 120 receives from the first communication device 110, the message that has been encoded, or encoded and modulated, by the first communication device 110 into the data packet variant corresponding to the physical transmission resources and/or physical layer parameters assigned to the first communication device 110.

Figure 6:
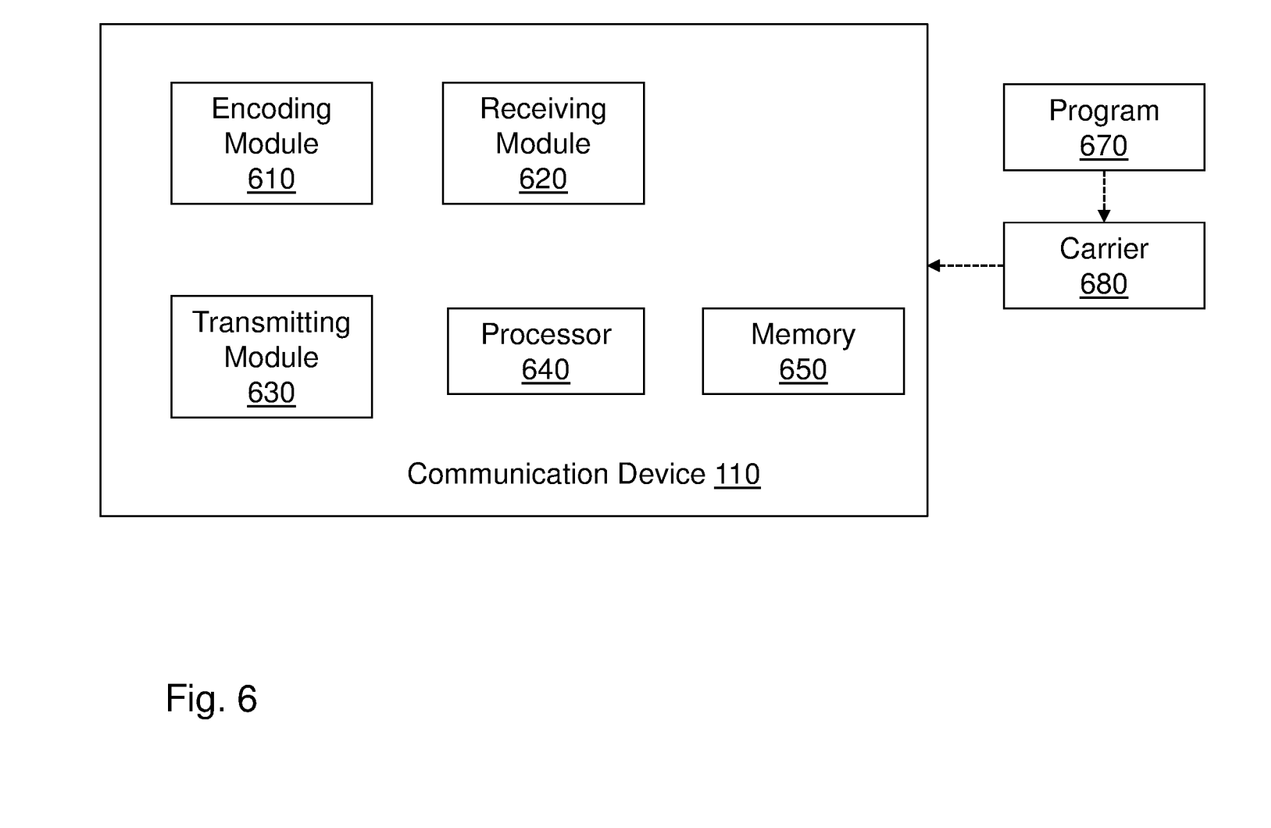
FIG. 6 is a schematic block diagram illustrating embodiments of a first communication device.

To perform the method actions in the first communication device 110 for transmitting a message generated in the first communication device 110 to the second communication device 120 in the wireless communication network 100, described above in relation to FIGS. 3-4, the first communication device 110 comprises the following circuits or modules depicted in FIG. 6. As mentioned above, the wireless communication network 100 comprises one or more LTE networks or any one or more 2G/3G/4G/5G networks or any other wireless network. The first communication device 110 is configured to, e.g. by means of an encoding module 610, prior to transmission of the message being triggered, encode and modulate, or just encode, the message into more than one data packet variants using different combinations of coding and/or modulation parameters for the more than one data packet variants.

The first communication device 110 is further configured to, e.g. by means of a receiving module 620, when transmission of the message is triggered, receive from the second communication device 120, information indicative of physical transmission resources and/or physical layer parameters assigned to the first communication device 110.

The first communication device 110 is further configured to, e.g. by means of a transmitting module 630, transmit the message using one of the more than one data packet variants, wherein the used data packet variant is selected based on the received information indicative of physical transmission resources and/or physical layer parameters.

According to some embodiments, the more than one data packet variants may correspond to all sets of possible physical transmission resources and/or physical layer parameters or to a subset of the sets of possible physical transmission resources and/or physical layer parameters. Thus, the first communication device 110 may further be configured to, e.g. by means of the receiving module 620, receive from the second communication device 120, information indicative of all the sets of possible physical transmission resources and/or physical layer parameters or the subset of the sets of possible physical transmission resources and/or physical layer parameters.

The first communication device 110 may further be configured to, e.g. by means of the transmitting module 630, transmit, to the second communication device 120, one or more sounding reference signals. The first communication device 110 may further be configured to receive, from the second communication device 120, one or more messages assigning a set of encoding formats to be applied when encoding, or encoding and modulating, the message generated in the first communication device 110 into the one or more data packet variants. The set of encoding formats to be used by the first communication device 110 may be assigned by the second communication device 120 based on the transmitted one or more sounding reference signals.

Those skilled in the art will appreciate that the encoding module 610, receiving module 620 and transmitting module 630, described above may be referred to one module, a combination of analog and digital circuits, one or more processors, such as processor 640, depicted in FIG. 6, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The first communication device 110 may further comprise a memory 650 comprising one or more memory units. The memory 650 is arranged to be used to store information, e.g. physical transmission resources and/or physical layer parameters, encoding formats, generated messages, pre-encoded data packets, buffer status reports, or other measurements and data, as well as configurations to perform the methods herein when being executed in the first communication device 110.

Figure 7:
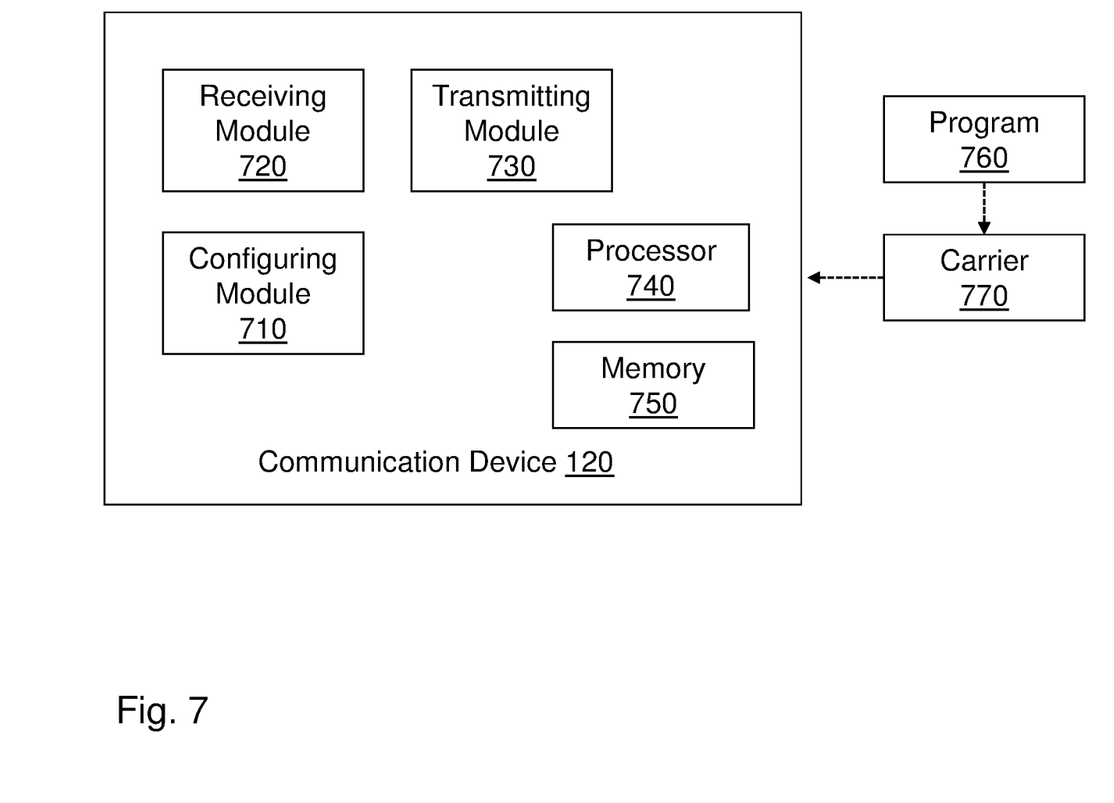
FIG. 7 is a schematic block diagram illustrating embodiments of a second communication device.

To perform the method actions in the second communication device 120 for receiving a message transmitted by the first communication device 110, the second communication device 120 comprises the following circuits or modules depicted in FIG. 7.

The second communication device 120 is configured to, e.g. by means of a configuring module 710, prior to receiving of a scheduling request from the first communication device 110, configure, or prepare for, reception of the message from the first communication device 110 by being configured to obtain information indicative of all sets of possible physical transmission resources and/or physical layer parameters, or indicative of a subset of the sets of possible physical transmission resources and/or physical layer parameters, available for receiving the message from the first communication device 110. The sets of possible physical transmission resources and/or physical layer parameters, or subset of the sets of possible physical transmission resources and/or physical layer parameters, correspond to more than one data packet variants obtainable for the first communication device 110 by encoding, or encoding and modulating, the message using different combinations of coding and/or modulation parameters.

When a scheduling request is received from the first communication device 110, e.g. by means of a receiving module 720, the second communication device 120 is further configured to, e.g. by means of a transmitting module 730, transmit to the first communication device 110, information indicative of physical transmission resources and/or physical layer parameters assigned to the first communication device 110. The second communication device 120 is further configured to, e.g. by means of the receiving module 720, receive the message that has been encoded, or encoded and modulated, by the first communication device 110 into the data packet variant corresponding to the physical transmission resources and/or physical layer parameters assigned to the first communication device 110.

The second communication device 120 may further be configured to, e.g. by means of the receiving module 720, prior to receiving of a scheduling request from the first communication device 110, receive, from the first communication device 110, one or more sounding reference signals and configured to, e.g. by means of the configuring module 710, determine a set of encoding formats to be used by the first communication device 110 for encoding the generated message, and/or determine the sets or subset of possible physical transmission resources and/or physical layer parameters available for transmitting the message, based on the received one or more sounding reference signals.

The second communication device 120 may further be configured to, e.g. by means of the transmitting module 730, prior to receiving of a scheduling request from the first communication device 110, transmit, to the first communication device 110, one or more messages assigning the set of encoding formats to be applied by the first communication device 110 when encoding, or encoding and modulating, the message in the first communication device 110 into the one or more data packet variants.

Alternatively or additionally, the second communication device 120 may further be configured to, e.g. by means of the transmitting module 730, prior to receiving of a scheduling request from the first communication device 110, transmit, to the first communication device 110, the obtained or determined information indicative of all sets of possible physical transmission resources and/or physical layer parameters, or indicative of a subset of the sets of possible physical transmission resources and/or physical layer parameters, available for transmitting the message. This information enables the first communication device 110 to encode, or encode and modulate, the message into the more than one data packet variants using different combinations of coding and/or modulation parameters.

Those skilled in the art will appreciate that the configuring module 710, receiving module 720 and transmitting module 730, described above may be implemented as one module, a combination of analog and digital circuits, one or more processors, such as processor 740, depicted in FIG. 7, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The second communication device 120 may further comprise a memory 750 comprising one or more memory units. The memory 750 is arranged to be used to store information, e.g. physical transmission resources and/or physical layer parameters, encoding formats, buffer status reports or other measurements and data, as well as configurations to perform the methods herein when being executed, e.g. by the processor 740, in the second communication device 120.

Although the methods performed either in the first communication device 110 or in the second communication device 120 are described with assumption that the first communication device 110 acts as a transmitting device and the second communication device 120 acts as a receiving device, the methods described above are equally applicable when the first communication device 110 acts as a receiving device, and the 35 second communication device 120 acts as a transmitting device. For acting as a receiving device, the first/second communication device 110/120 may be a network node, a base station or a peer communication device.

The embodiments herein in the first device 110 for transmitting messages and in the second communication device 120 for receiving messages, in the wireless communication system 100, may be implemented through one or more processors, such as the processor 640 in the first communication device 110 and the processor 740 in the second communication device 120, together with computer program code, such as the program 670 in the first communication device 110, and the program 760 in the second communication device 120, for performing the functions and actions of the embodiments herein. The program code mentioned above may also be provided as a computer program product, for instance in the form of a data carrier, such as the carrier 680 in the first communication device 110, and the carrier 770 in the second communication device 120, carrying computer program code for performing the embodiments herein when being loaded into the first/second communication device 110/120. One such carrier may be in the form of a Compact Disc, read-only-memory (CD ROM) disc. It is however feasible with other data carriers such as a memory stick. The computer program code may furthermore be provided as program code on a server and downloaded to the first/second communication device 110/120.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a first communication device for transmitting a message generated in the first communication device to a second communication device in a wireless communication network, the method comprising:
  prior to transmission of the message being triggered, encoding the message into more than one data packet variants;
  when transmission of the message is triggered, receiving, from the second communication device, information indicative of physical transmission resources and/or physical layer parameters assigned to the first communication device;
  selecting one of the data packet variants based on the received information indicative of physical transmission resources and/or physical layer parameters;
  modulating the message either:
    into the data packet variants prior to the transmission of the message being triggered; or
    using the selected data packet variant;
  transmitting the message using the selected data packet variant;

wherein the encoding and/or modulating comprises using different combinations of coding and/or modulation parameters for the more than one data packet variants.

2. The method of claim 1, wherein modulating the message comprises modulating the message using the selected data packet variant.

3. The method of claim 1, wherein the data packet variants correspond to different amounts of physical transmission resources.

4. The method of claim 1, further comprising selecting modulation order and defining different mapping of physical transmission resources in time-domain, code-domain, space-domain, frequency-domain and/or time-frequency-domain to produce the data packet variants.

5. The method of claim 1, further comprising, to produce the data packet variants, scrambling, rate matching, error coding, segmentation and Cyclic Redundancy Check, CRC, and/or insertion.

6. The method of claim 1, further comprising, to produce the data packet variants, Run-Length Coding (RLC), segmentation, concatenation and generation of RLC and Media Access Control (MAC) headers, and/or insertion of MAC control elements and padding.

7. The method of claim 1, wherein the data packet variants correspond to different transport block sizes.

8. The method of claim 1, wherein the message generated in the first communication device is a time-critical message.

9. The method of claim 1, further comprising:
transmitting, to the second communication device, one or more sounding reference signals;
receiving, from the second communication device, one or more messages assigning a set of encoding formats to be applied when producing the data packet variants from the message, the set of encoding formats being assigned based on the transmitted one or more sounding reference signals.

10. The method of claim 9, wherein the assigned set of encoding formats comprises encoding formats which are different depending on physical transmission resources, reception points, transmission points and/or received interferences.

11. The method of claim 1, wherein receiving, from the second communication device, information indicative of physical transmission resources and/or physical layer parameters assigned to the first communication device comprises receiving, from the second communication device, an index indicating the physical transmission resources and/or physical layer parameters assigned to the first communication device.

12. A method performed in a second communication device for receiving a message transmitted by a first communication device in a wireless communication network, the method comprising:
prior to receiving a scheduling request from the first communication device, configuring reception of the message from the first communication device by obtaining information indicative of:
all sets of possible physical transmission resources and/or physical layer parameters available for receiving the message from the first communication device; or
a subset of the sets of possible physical transmission resources and/or physical layer parameters;
wherein the sets or subset of the sets correspond to data packet variants obtainable for the first communication device by encoding, or encoding and modulating, the message using different combinations of coding and/or modulation parameters;
when a scheduling request is received from the first communication device, transmitting, to the first communication device, information indicative of physical transmission resources and/or physical layer parameters assigned to the first communication device; and
receiving, from the first communication device, the message that has been encoded, or encoded and modulated, by the first communication device into the data packet variant corresponding to the physical transmission resources and/or physical layer parameters assigned to the first communication device.

13. The method of claim 12, wherein configuring reception of the message from the first communication device further comprises:
receiving, from the first communication device, one or more sounding reference signals;
transmitting, to the first communication device, one or more messages assigning a set of encoding formats to be applied by the first communication device when encoding, or encoding and modulating, the message in the first communication device into the one or more data packet variants;
wherein the set of encoding formats are assigned based on the received one or more sounding reference signals.

14. A first communication device for transmitting a message generated in the first communication device to a second communication device in a wireless communication network, the first communication device comprising:
processing circuitry and memory, the memory containing instructions executable by the processing circuitry, whereby the first communication device is configured to:
prior to transmission of the message being triggered, encode the message into more than one data packet variants;
when transmission of the message is triggered, receive, from the second communication device, information indicative of physical transmission resources and/or physical layer parameters assigned to the first communication device;
select one of the data packet variants based on the received information indicative of physical transmission resources and/or physical layer parameters;
modulate the message either:
into the data packet variants prior to the transmission of the message being triggered; or
using the selected data packet variant;
transmit the message using the selected data packet variant;
wherein to encode and/or modulate, the first communication device is configured to use different combinations of coding and/or modulation parameters for the more than one data packet variants.

15. The first communication device of claim 14, wherein to modulate the message the first communication device is configured to use the selected data packet variant.

16. The first communication device of claim 14, wherein the data packet variants correspond to different amounts of physical transmission resources.

17. The first communication device of claim 14, further configured to select modulation order and define different mapping of physical transmission resources in time-domain, code-domain, space-domain, frequency-domain and/or time-frequency-domain to produce the data packet variants.

18. The first communication device of claim 14, further configured to produce the data packet variants using scrambling, rate matching, error coding, segmentation and Cyclic Redundancy Check, CRC, and/or insertion.

19. The first communication device of claim 14, further configured to produce the data packet variants using Run-Length Coding (RLC), segmentation, concatenation and generation of RLC and Media Access Control (MAC) headers, and/or insertion of MAC control elements and padding.

20. The first communication device of claim 14, wherein the data packet variants correspond to different transport block sizes.

21. The first communication device of claim 14, wherein the message generated in the first communication device is a time-critical message.

22. The first communication device of claim 14, further configured to:
transmit, to the second communication device, one or more sounding reference signals;
receive, from the second communication device, one or more messages assigning a set of encoding formats to be applied when producing the data packet variants from the message, the set of encoding formats being assigned based on the transmitted one or more sounding reference signals.

23. The first communication device of claim 22, wherein the assigned set of encoding formats comprises encoding formats which are different depending on physical transmission resources, reception points, transmission points, and/or received interferences.

24. The first communication device of claim 14, wherein to receive, from the second communication device, information indicative of physical transmission resources and/or physical layer parameters assigned to the first communication device, the first communication device is configured to receive, from the second communication device, an index indicating the physical transmission resources and/or physical layer parameters assigned to the first communication device.

25. A second communication device for receiving a message transmitted by a first communication device in a wireless communication network, the second communication comprising:
processing circuitry and memory, the memory containing instructions executable by the processing circuitry, whereby the second communication device is configured to:
prior to receiving a scheduling request from the first communication device, configure reception of the message from the first communication device by being configured to obtain information indicative of:
all sets of possible physical transmission resources and/or physical layer parameters available for receiving the message from the first communication device; or
a subset of the sets of possible radio resources and/or physical layer parameters;
wherein the sets or subset of the sets correspond to data packet variants obtainable for the first communication device by encoding, or encoding and modulating, the message using different combinations of coding and/or modulation parameters;
when a scheduling request is received from the first communication device, transmit, to the first communication device, information indicative of physical transmission resources and/or physical layer parameters assigned to the first communication device; and
receive, from the first communication device, the message that has been encoded, or encoded and modulated, by the first communication device into the data packet variant corresponding to the physical transmission resources and/or physical layer parameters assigned to the first communication device.

26. The second communication device of claim 25, wherein being configured to configure reception of the message from the first communication device further comprises being configured to:
receive, from the first communication device, one or more sounding reference signals;
transmit, to the first communication device, one or more messages assigning a set of encoding formats to be applied by the first communication device when encoding, or encoding and modulating, the message in the first communication device into the one or more data packet variants, the set of encoding formats being assigned based on the received one or more sounding reference signals.

* * * * *